United States Patent
McClain et al.

(10) Patent No.: US 8,839,501 B2
(45) Date of Patent: Sep. 23, 2014

(54) SEATBACK-MOUNTABLE HOLDER FOR A PORTABLE ELECTRONIC DEVICE

(76) Inventors: Bryan Ulrich McClain, Foster City, CA (US); Demetrius Madrigal, Sunnyvale, CA (US); Anthony Printis, Redwood City, CA (US)

( * ) Notice: Subject to any disclaimer, the term of this patent is extended or adjusted under 35 U.S.C. 154(b) by 566 days.

(21) Appl. No.: 13/072,685

(22) Filed: Mar. 26, 2011

(65) Prior Publication Data

US 2012/0241572 A1 Sep. 27, 2012

(51) Int. Cl.
B23P 11/00 (2006.01)
B60R 11/02 (2006.01)
B60N 3/00 (2006.01)
B60N 2/44 (2006.01)
B60R 11/00 (2006.01)
F16B 2/12 (2006.01)

(52) U.S. Cl.
CPC ......... B60N 3/004 (2013.01); B60N 2002/4405 (2013.01); B60R 2011/0085 (2013.01); B60R 11/02 (2013.01); B60R 2011/0015 (2013.01); F16B 2/12 (2013.01)
USPC ..................... 29/525.01; 29/559; 248/221.11; 248/222.11; 248/231.51; 248/302

(58) Field of Classification Search
CPC .... B60R 2011/0071; B60R 7/043; F16B 2/12
USPC .................. 29/525.01, 559; 248/493, 229.22, 248/229.23, 229.24, 229.26, 231.41, 248/231.51, 231.81, 302, 316.4, 316.5, 315, 248/220.21, 220.22, 221.11, 221.12, 248/222.11, 225.21; 224/275, 545, 558, 224/572, 929
See application file for complete search history.

(56) References Cited

U.S. PATENT DOCUMENTS

2008/0070641 A1   3/2008  Wang
2008/0296334 A1  12/2008  Carnevali
2009/0060473 A1   3/2009  Kohte et al.
2010/0288900 A1  11/2010  Janik

FOREIGN PATENT DOCUMENTS

DE         102008010032 A1  * 10/2008

OTHER PUBLICATIONS

Fenten, Randy, file titled "130422_Zhip_Internet_pages.pdf" with pages riginal publication date unknown but Internet page marked with copyright year 2010.

* cited by examiner

Primary Examiner — Jermie Cozart
(74) Attorney, Agent, or Firm — Phillip M. Wagner

(57) ABSTRACT

A holder for removably attaching a portable electronic device to an elongate support such as a tray table latch on a seatback with a stowable tray table comprises a clamp frame, a spring compression lever slidably attached to the clamp frame, a flexible band for suspending the clamp frame from the elongate support and a self-centering clamp for gripping opposite sides of the elongate support. The holder may optionally include a device adapter for attaching a selected electronic device. Another embodiment comprises steps in a method for holding a portable electronic device against a seatback having a stowable seatback tray table.

3 Claims, 23 Drawing Sheets

SEATBACK-MOUNTABLE HOLDER FOR A PORTABLE ELECTRONIC DEVICE

FIELD OF THE INVENTION

The present invention relates generally to an apparatus for holding an electronic device and more particularly to an adjustable holder for attaching a portable electronic device to a seat having a stowable seatback tray table.

BACKGROUND

Communications, information services, entertainment, and other applications and functions that were once provided by separate electronic devices are now commonly provided by "smart" phones and other advanced portable electronic devices such as electronic tablets, portable gaming systems and electronic book readers having bright, colorful, high-resolution displays. As a result, people are spending more and more time interacting with portable electronic devices for viewing maps, watching movies, conducting Internet searches, receiving news, sending and receiving email and text messages, playing games, and other visually intensive and time consuming activities. The small size of such devices makes them easy to carry and easy to use in confined conditions. However, because of the small size of the displays used in many portable electronic devices, the best viewing may occur over a relatively narrow range of viewing angles. Furthermore, the relatively small sizes of visual elements such as text and graphics that may be presented on small displays are best viewed when a portable electronic device is held steady, without shaking or other relative motions between the display and observer.

A person may find it tiresome to hold a portable electronic device steady at a preferred viewing angle and viewing distance for an extended period of time. Furthermore, it can be difficult to perform other tasks while one's hands are occupied with holding a portable electronic device. Many different kinds of mounting devices such as stands, holders, clamps, and rests have been proposed for freeing one's hands and steadying a small display for easier viewing. Some mounting devices are adequate for resting a portable electronic device on a stationary table, desk, or other flat surface, but may not provide sufficient stability or an acceptable range of viewing angles when a steady support surface at a preferred viewing distance or height is unavailable, for example in a moving vehicle. Other mounting devices depend on suction cups or magnets for attaching the mounting device to a support structure, but suction cups are ineffective on porous or textured surfaces and magnetic attachments are ineffective on nonferrous support structures. Yet other mounting devices use hooks or clips to attach to a support structure such as a seat back, a table edge, and other locations with an edge or projection suitable for attaching a hook or clip. However, a hook or clip having a size and shape suited for attachment to one type of support structure may be unable to attach to other types of support structures.

Some mounting devices don't provide firm enough support for an electronic device and may release the electronic device, or the mounting device itself may separate from a support structure, when subjected to vibration, acceleration, normal operation of a keypad or touch screen, or accidentally bumping the mounting device or portable electronic device, as may occur in a moving vehicle. Other mounting devices may have the opposite problem, that is, they do not release from the support structure when a large load is applied to an electronic device or to the mounting device itself, thereby risking damage to the support structure, the mounting device, or the electronic device. Some mounting devices are bulky and difficult to carry when not in use. Other mounting devices project a substantial distance from the surface of the structure to which they are attached and may interfere with the movements of other people in the vicinity, for example by impeding aisle access for a person seated near a mounting device attached to a seatback on a train, bus, or airplane.

SUMMARY

Embodiments of the invention comprise a holder for removably attaching a portable electronic device to an elongate support. A holder in accord with an embodiment of the invention includes a clamp frame and a spring compression lever slidably connected to the clamp frame. The holder further includes a flexible band for suspending the holder from an elongate support. The flexible band has a fixed end connected to the clamp frame and a detachable end which may be moved toward the fixed end of the band by sliding the spring compression lever toward the stationary lever. The holder also includes a self-centering clamp for gripping the elongate support.

Some embodiments of the invention include a holder for removably attaching a portable electronic device to a tray latch for a seatback tray table. The holder for attaching to a seatback tray table latch includes a clamp assembly having a first clamping means for suspending the holder from the tray latch and a second clamping means for preventing relative rotation between the clamp assembly and the tray latch. The holder for attaching to a seatback tray table optionally includes a device adapter configured to securely hold a selected portable electronic device and a pivot assembly for adjusting the device holder to a selected viewing angle relative to the clamp assembly.

Other embodiments of the invention include a method for holding a portable electronic device against a seatback having a stowable seatback tray table. An example of a method in accord with an embodiment of the invention includes placing the seatback tray table in either a stowed position in the seatback or in an unfolded position for use as a table, placing the tray latch in an orientation used for holding the seatback tray table in a stowed position, suspending a holder for a portable electronic device from the tray latch by an adjustable flexible strap attached to the back of the holder, and pressing the holder for a portable electronic device against the tray latch until a self-centering clamp on the holder grips the tray latch.

This section summarizes some features of the present embodiment. These and other features, aspects, and advantages of the embodiments of the invention will become better understood with regard to the following description and upon reference to the following drawings, wherein:

DESCRIPTION

Figure 1:
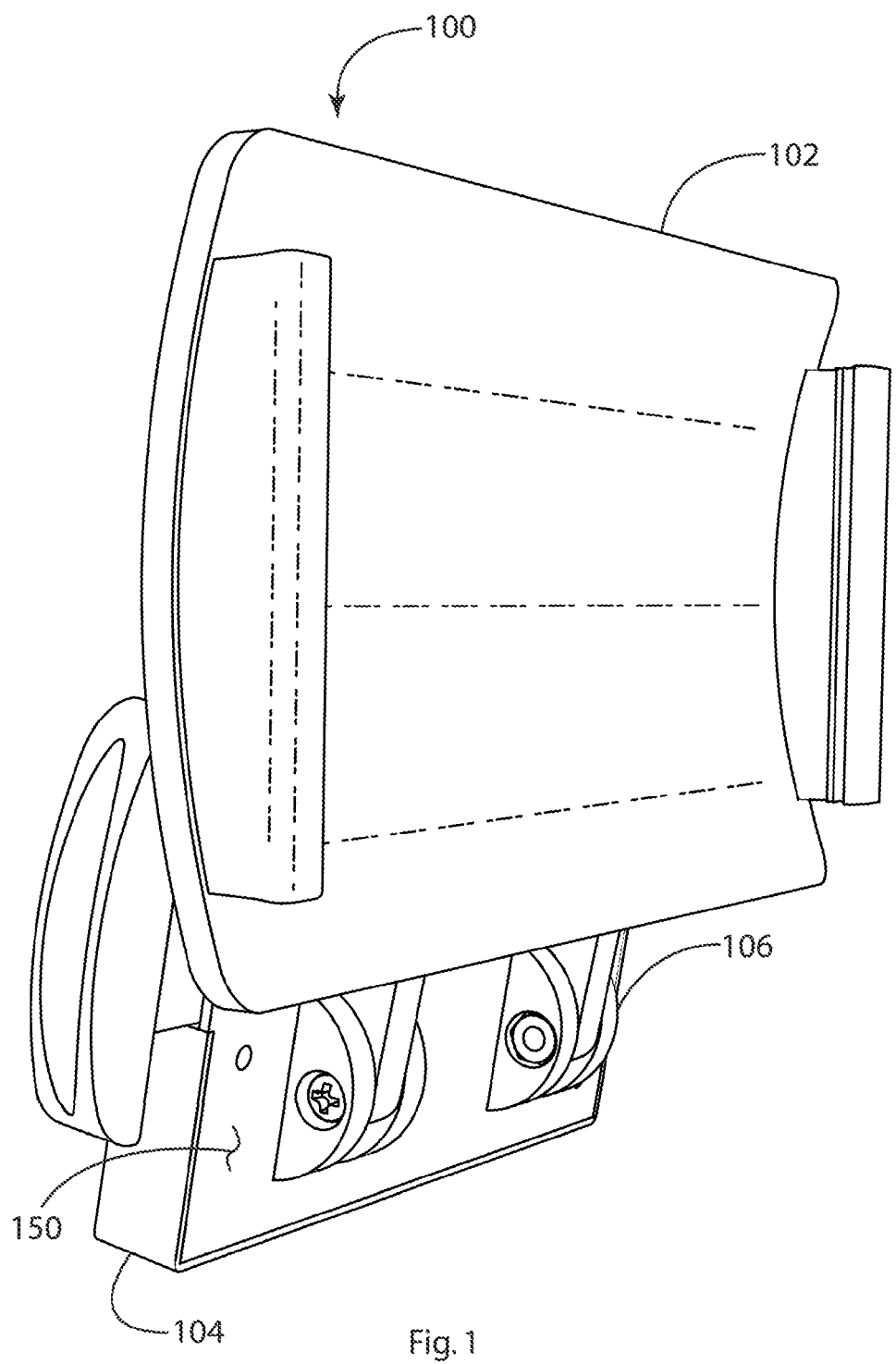
FIG. 1 is a pictorial view of an example of a holder in accord with an embodiment of the invention.

Embodiments of the invention comprise a holder for removably supporting a portable electronic device from an approximately vertical support structure such as a tray table latch on the seatback of a reclinable passenger seat on an aircraft, train, or bus. A seatback-mountable holder in accord with an embodiment of the invention, also referred to herein as a holder, enables a person seated in an adjacent seat behind the seat to which the holder is attached to comfortably and safely view an electronic device attached to the holder, freeing the person's hands from holding the portable electronic device. The holder is capable of being adjusted to present a portable electronic device's display screen at a comfortable viewing angle whether the seatback to which the holder is attached is fully upright, i.e., not reclined, partially reclined, or reclined to its limit, i.e., fully reclined.

Other advantages of the embodiments of the invention include, but are not limited to, separation of the holder from the seatback to which it is attached without causing damage to parts of the seatback. The holder is easily adapted to securely grip a variety of portable electronic devices, thereby protecting the portable electronic device from damage and enabling a steady, stable view of information displayed by the portable electronic device. Embodiments of the invention also include features for separating the holder and its attached portable electronic device from a seatback when a large load is applied to the holder, for example when a passenger or an object bumps into the holder. A holder embodiment of the invention therefore offers increased safety for passengers in a vehicle compared to devices which suspend a portable electronic device by hooks, lanyards, spring clips, or other means lacking controlled separation features, or which merely provide a stand intended to rest on a support surface such as a table top. A holder embodiment of the invention may be quickly and easily detached from a seatback or other support structure when it is desirable to do so, and the holder may be folded into a compact, relatively thin, and relatively flat configuration for convenient storage or transport.

Portable electronic devices suitable for use with an embodiment of the invention include, but are not limited to, cellular telephones, cameras, audio recording devices, audio playback devices such as MP3 players, video playback devices, electronic devices for playing games, and devices combining two or more of these functions.

Some embodiments of the invention comprise a seatback-mountable holder with a device adapter for holding a portable electronic device and a clamp assembly for removably connecting the holder to an approximately vertical structure such as a tray table latch on a seatback. Other embodiments of the invention comprise a clamp assembly without a device adapter. Yet other embodiments of the invention include steps in a method for holding a portable electronic device against a seatback having a stowable seatback tray table.

A rotatable tray table latch on a passenger seat with a stowable seatback tray table is used herein as an example of an elongate support to which an embodiment of the invention may be attached. Other examples of elongate supports which may be used with an embodiment of the invention include, but are not limited to, a cabinet handle, a door handle, a control lever on an instrument panel or appliance, and other structures which may be placed in an approximately vertical orientation and around which a flexible strap or band may be placed. A vertical orientation as referenced herein applies to a structure having a longest dimension in a vertical plane, where a vertical plane is one that is approximately perpendicular to a surface upon which a person may stand or sit. With reference to an embodiment of the invention, a vertical direction is a direction from a bottom side of the holder toward a top side, or vice versa, when the holder is positioned as if attached to a latch or other elongate support for viewing a display on a portable electronic device. A lateral direction refers to a direction from a left side of a holder toward a right side, or vice versa. A reference to a front side or front surface refers to a structure that is visible from the viewing direction of a person using the holder when the holder is attached to a seatback.

Figure 2:
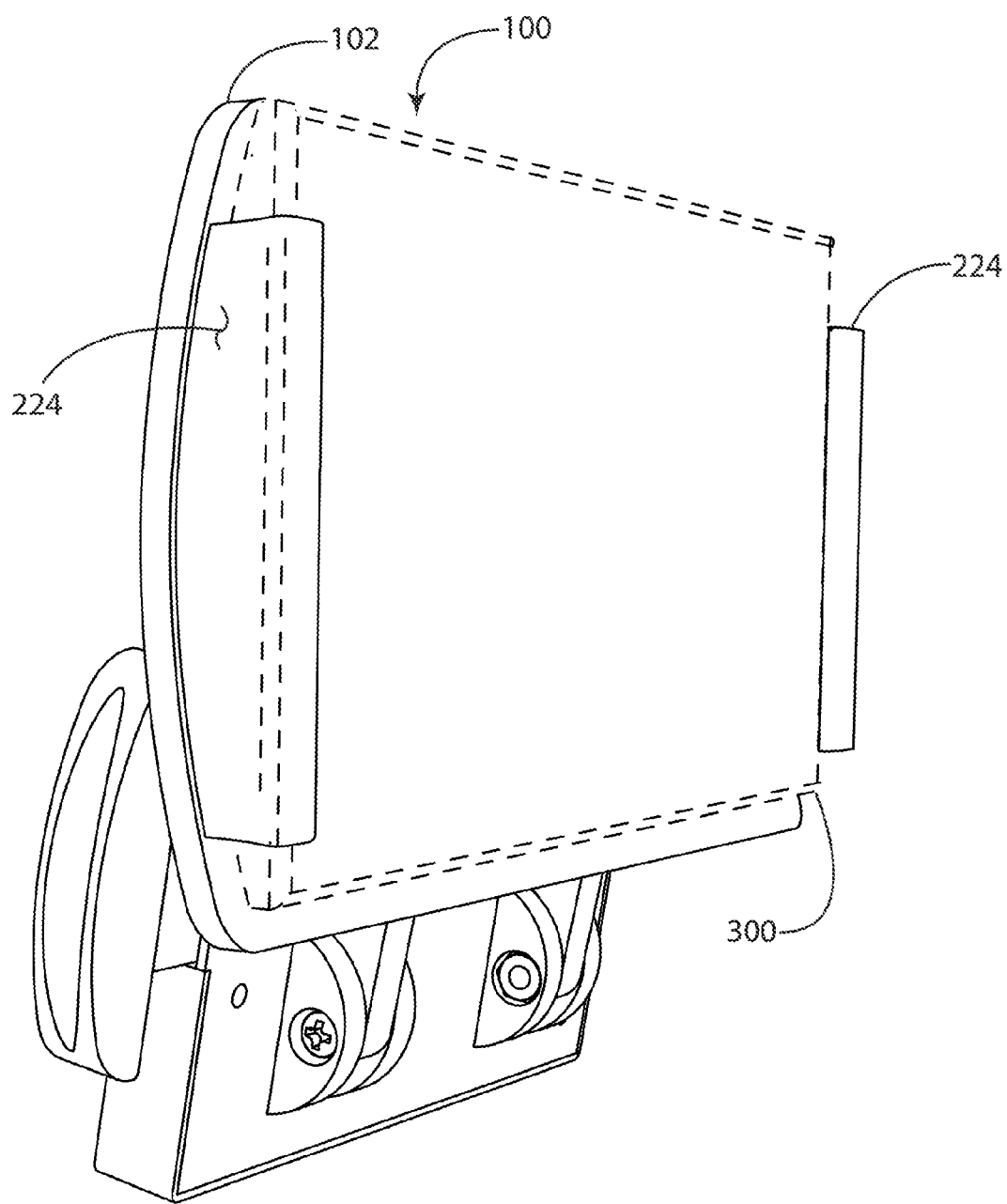
FIG. 2 illustrates an example of a portable electronic device attached to the holder of FIG. 1.

Turning now to FIG. 1, a seatback-mountable holder embodiment of the invention 100 comprises a clamp assembly 104 for attaching the holder to an elongate support and optionally includes a device adapter 102 for holding a portable electronic device securely in the holder 100. The device adapter 102 is rotatably connected to the clamp assembly 104 by a pivot assembly 106. The device adapter 102 may be set at a viewing angle selected by a user for comfortable viewing by tipping the device adapter 102 at an angle relative to a front panel 150 on the front of the clamp assembly 104. FIG. 2 shows an example of a portable electronic device 300 held securely between a first retaining bracket 224 on a left side of the device adapter 102 and a second retaining bracket 224 on a right side of the device adapter 102. The portable electronic device 300 is shown in FIG. 2 with broken lines to indicate that the portable electronic device is not considered to be a part of the holder embodiment of the invention.

Figure 3:
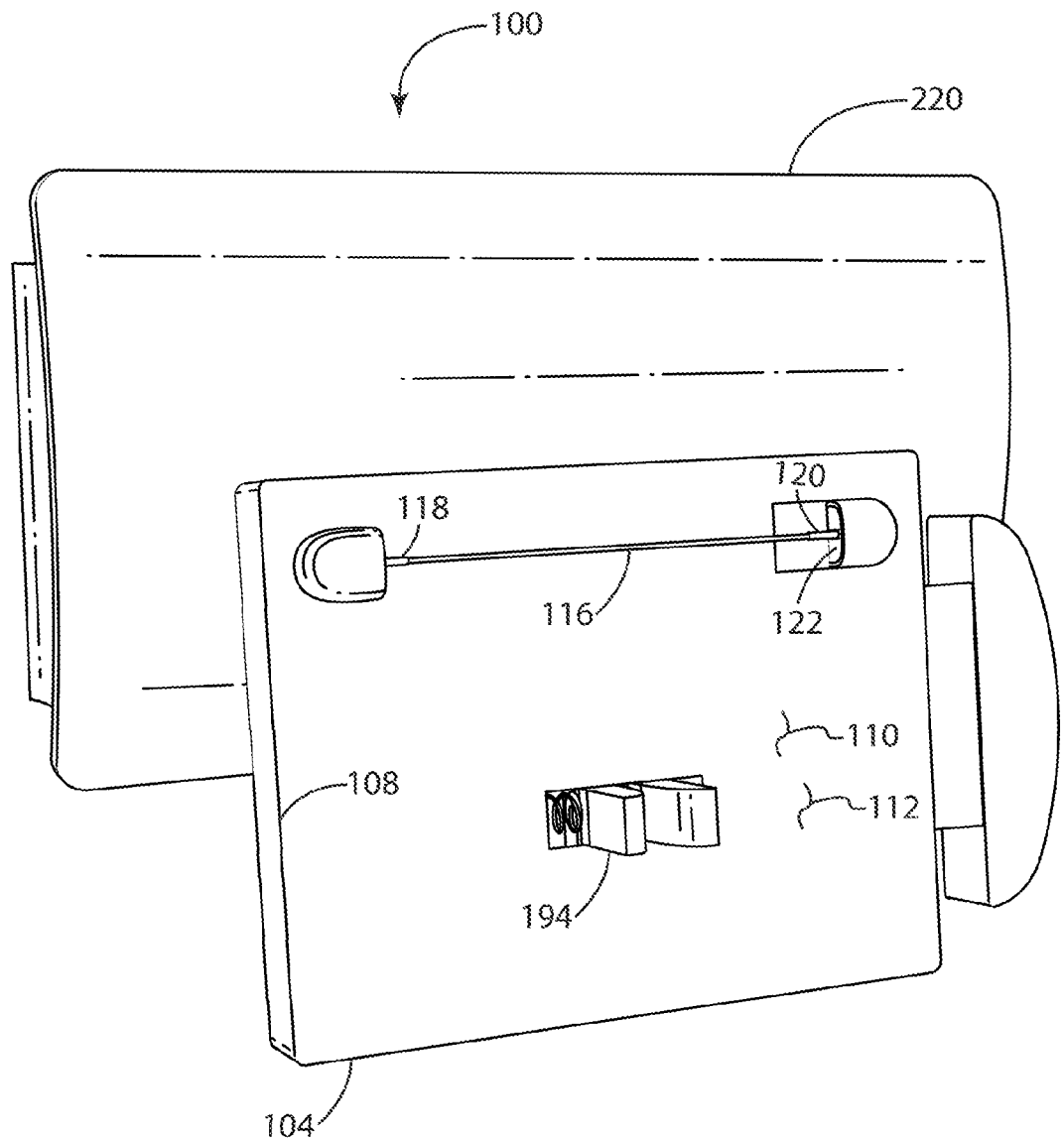
FIG. 3 shows a rear pictorial view of the holder of FIGS. 1-2.

FIG. 3 illustrates a view toward a back surface 112 of a back panel 110 for the clamp assembly 104. The back panel 110 is part of a clamp frame 108 for the clamp assembly 104. A rear surface of an adapter body 220 for supporting other parts of a device adapter is also shown in the holder 100 of FIG. 3. The clamp assembly 104 includes two separate means for attaching the holder 100 to an elongate support. A flexible band 116 is provided for suspending the holder from the elongate support. A self-centering clamp 194 is provided for clamping against opposite sides of a vertically-oriented elongate support and for approximately centering the holder 100 laterally on the elongate support. The flexible band 116 includes a fixed end 118 attached to a clamp frame 108 and a detachable end 120 detachably connected to the clamp assembly 104 by a flexible band connector 122. The flexible band connector 122 enables the detachable end 120 of the flexible band 116 to separate from the clamp frame 108 when a selected magnitude of load is applied to the holder 100 or to a portable electronic device attached to the holder 100, for example when a person bumps into the holder or portable electronic device.

When the detachable end 120 of the flexible band 116 separates from the clamp frame 108, the holder 100 is released from the elongate support, thereby preventing damage to the elongate support or other parts of the supporting structure, to the holder 100, or to the portable electronic device attached to the holder. Releasing the holder 100 from the elongate support may also prevent injury to a person who inadvertently bumps or strikes the holder 100 or portable electronic device. The self-centering clamp 194 stabilizes the holder 100 for comfortable viewing of a display on a portable electronic device, but does not grip the elongate support so firmly as to interfere with detachment of the holder from the seatback when a large load is applied to the holder or when a person deliberately removes the holder from the latch.

Figure 4:
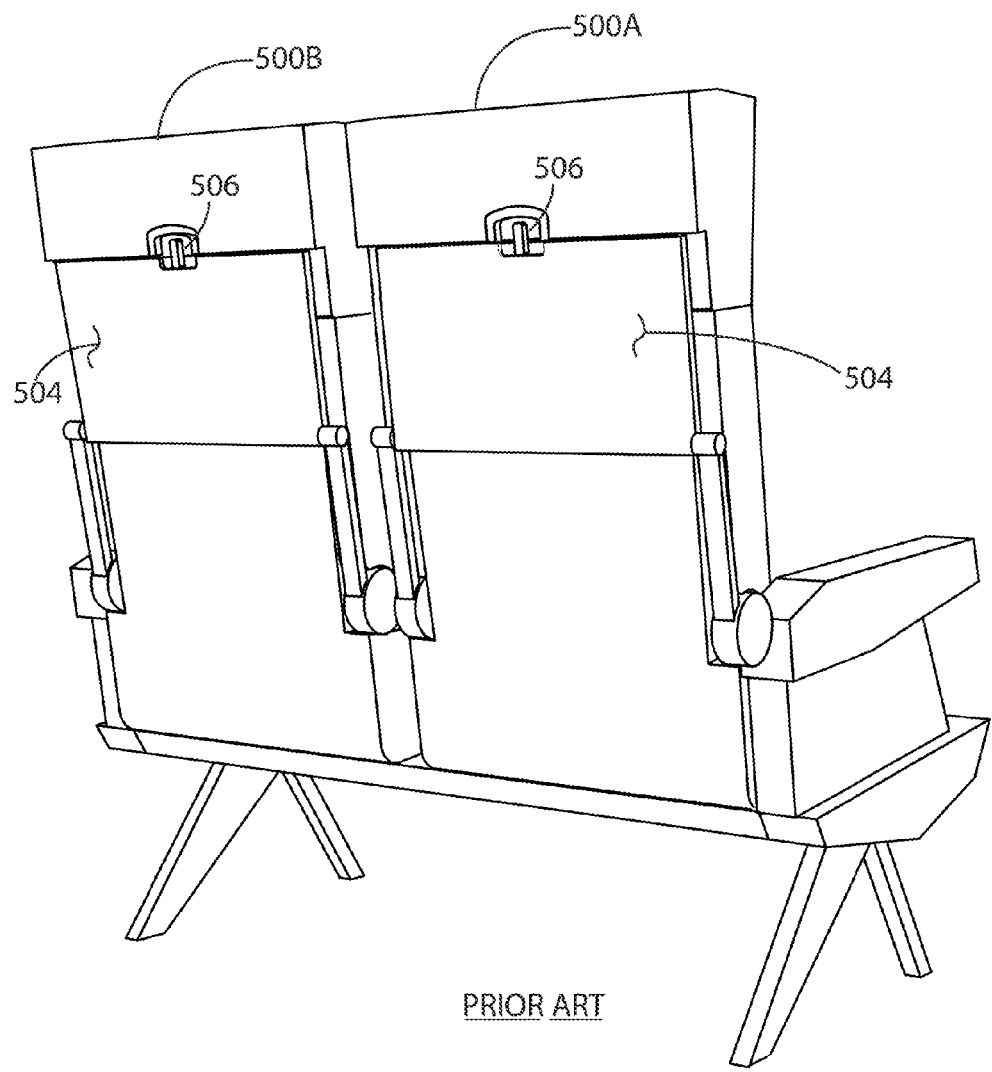
FIG. 4 shows a rear pictorial view of reclinable seats having stowable seatback tray tables. (PRIOR ART)
Figure 5:
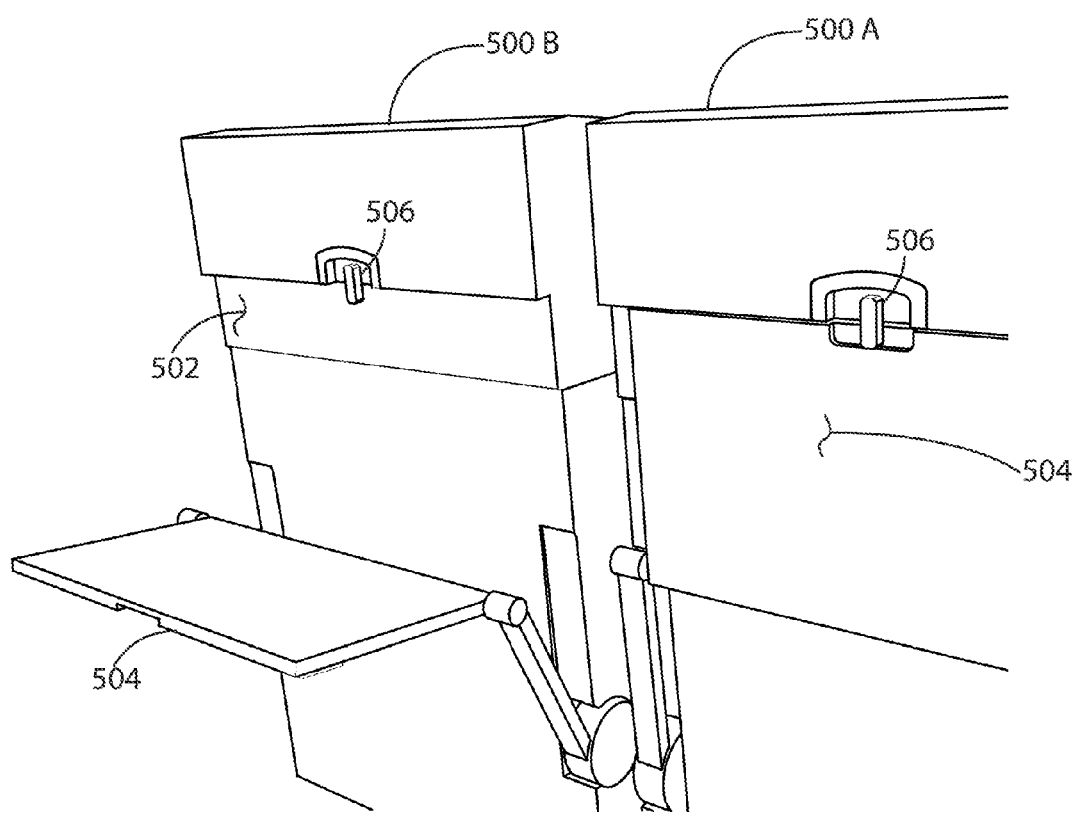
FIG. 5 shows the reclinable seats of FIG. 4, with one tray table in a stowed position and one tray table in an unstowed position. (PRIOR ART)

As previously explained, a latch for a seatback tray table is an example of a support structure to which an embodiment of the invention may be attached. The prior art illustrations of FIGS. 4-5 show the seatback latch and other parts commonly found on passenger seats having stowable seatback tray tables. FIGS. 4-5 show pictorial views toward the back side of a two side-by-side reclinable passenger seats 500. In FIG. 4, each seat 500 is equipped with a tray table 504 held in a stowed position against the seatback 502 by a tray table latch 506. The latches 506 in FIGS. 4 and 5 are shown in a vertical orientation with a longest dimension of each latch in a vertical plane. The seatback 502 of seat 500A is shown in a fully upright, i.e., not reclined, position. Seat 500B is shown in a partially reclined position. In FIG. 5, a tray table 504 on the seatback 502 of the partially reclined seat 500B is shown in an unstowed position. The latch 506 has been rotated to a vertical orientation and may be used for attachment of a holder embodiment of the invention. A second tray table 504 on the fully upright seat 500A is shown in a stowed position, also with its latch 506 in a vertical orientation.

Figure 6:
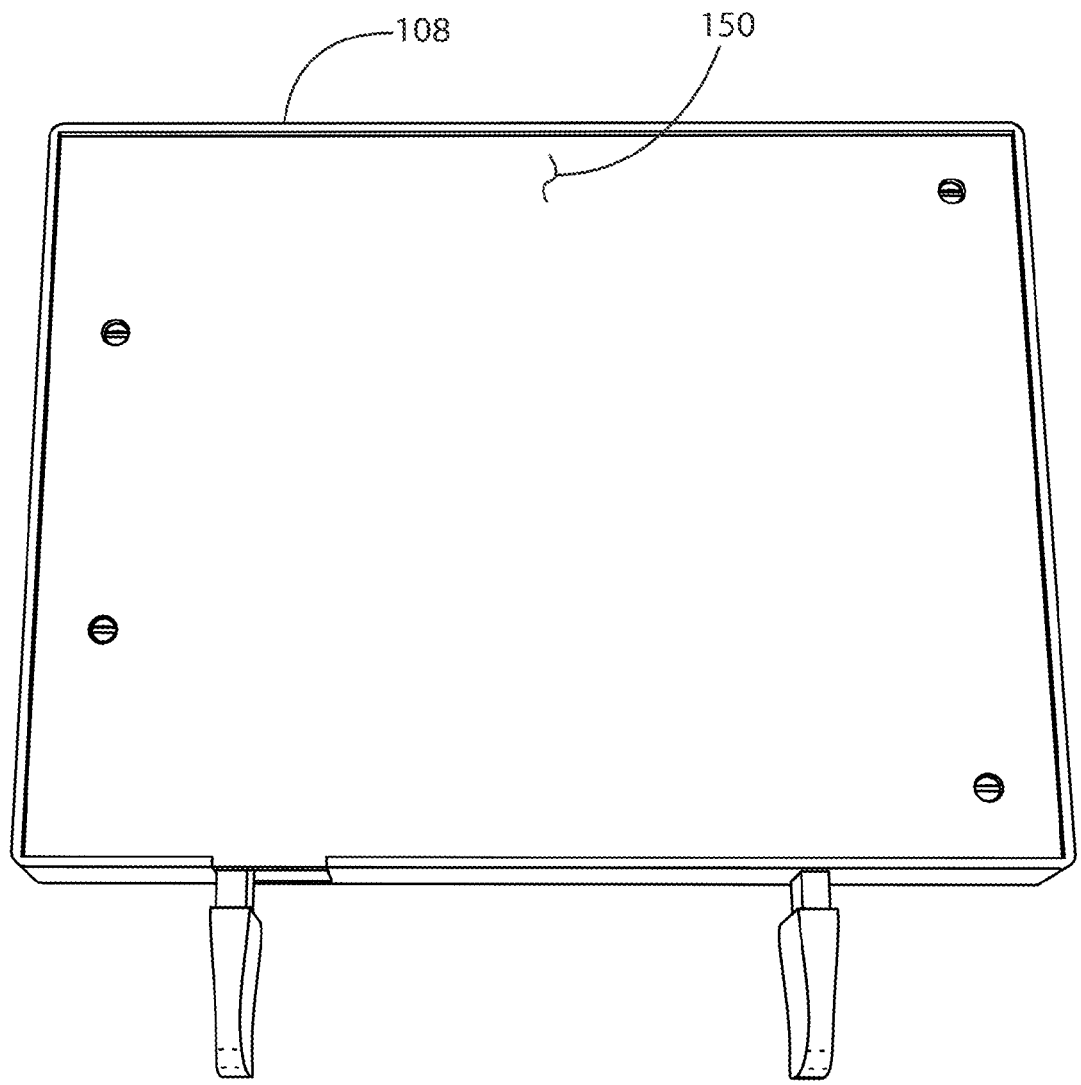
FIG. 6 shows a front view of an example of a clamp frame with a front cover in place.
Figure 7:
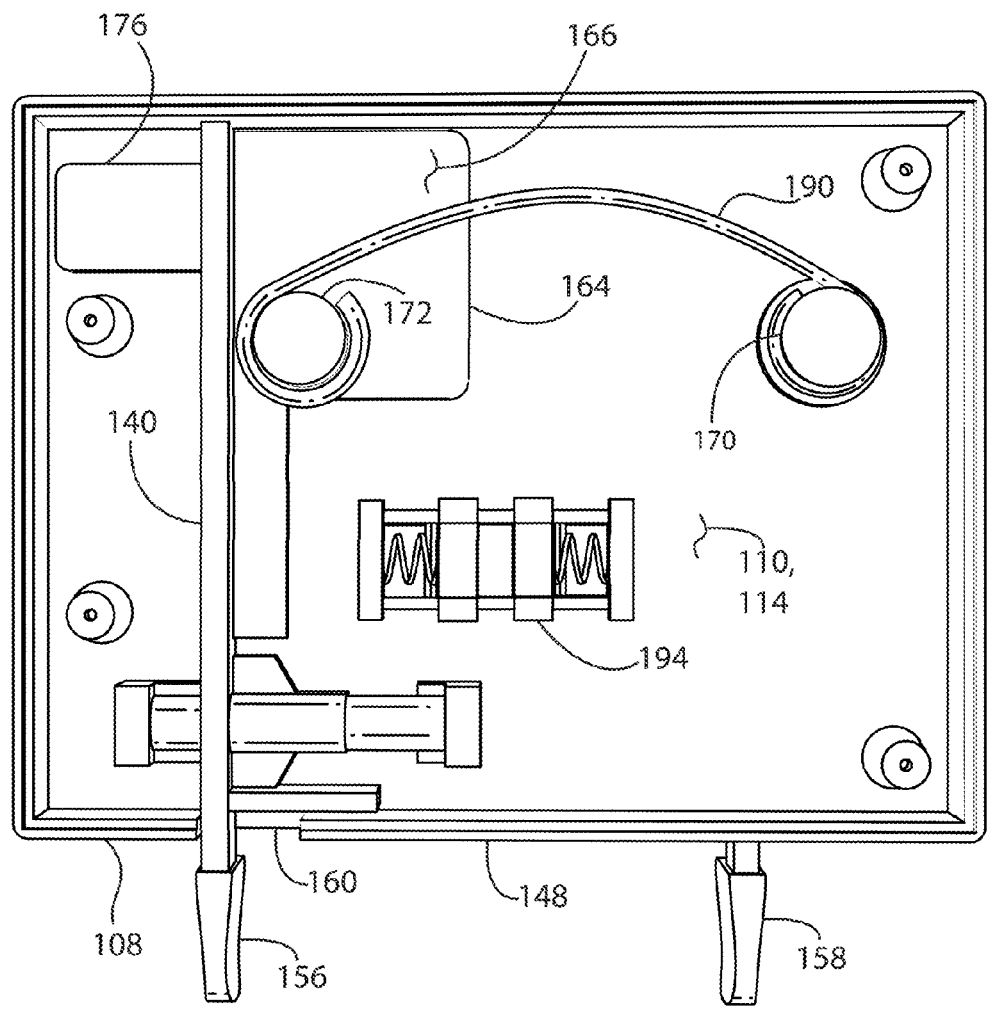
FIG. 7 shows a front view of the clamp frame of FIG. 6 with the front cover removed.

A view toward the front panel 150 of the clamp frame 108 is shown in FIG. 6. The front panel 150 may be removably attached to the clamp frame 108 with screws as shown. FIG. 7 shows the clamp frame 108 in the same orientation as in FIG. 6, but with the front panel 150 removed to show the arrangement of parts inside the clamp frame 108. As shown in FIG. 7, the clamp assembly 104 includes a clamp frame 108 to which the self-centering clamp 194 and other parts are attached. A spring compression lever 140 is in sliding contact with a front surface 114 of the back panel 110. The spring compression lever and related components are used to control tension in the flexible band 116 of FIG. 3. The spring compression lever 140 includes a spring plate 164 and a band plate 176. A first spring post 170 is attached to the back panel 110 of the clamp frame 108 and a second spring post 172 is attached to the front surface 166 of the spring plate 164. A back surface (not visible) of the spring plate 164 provides a bearing surface for sliding contact between the spring compression lever 140 and the back panel 110 of the clamp frame 108. A band tensioning spring 190 is compressed by a lateral motion of the spring compression lever 140 and provides a restoring force for pushing the spring compression lever 140 laterally away from the first spring post 170, thereby removing slack from the flexible band 116.

In the example of a clamp assembly 104 shown in FIG. 7, an end of the spring compression lever 140 extends through a slot 160 formed in a bottom side 148 of the clamp frame 108. A finger grip 156 on the spring compression lever 140 and a corresponding finger grip on a fixed lever 158 are provided for a person to move the spring compression lever 140 to form a slack loop in the flexible band. A slot cover 162 attached to the spring compression lever 140 provides a bearing surface for the spring compression lever against the bottom side 148 of the clamp frame 108 and prevents dirt from entering the clamp assembly 104 through the slot 160.

Figure 8:
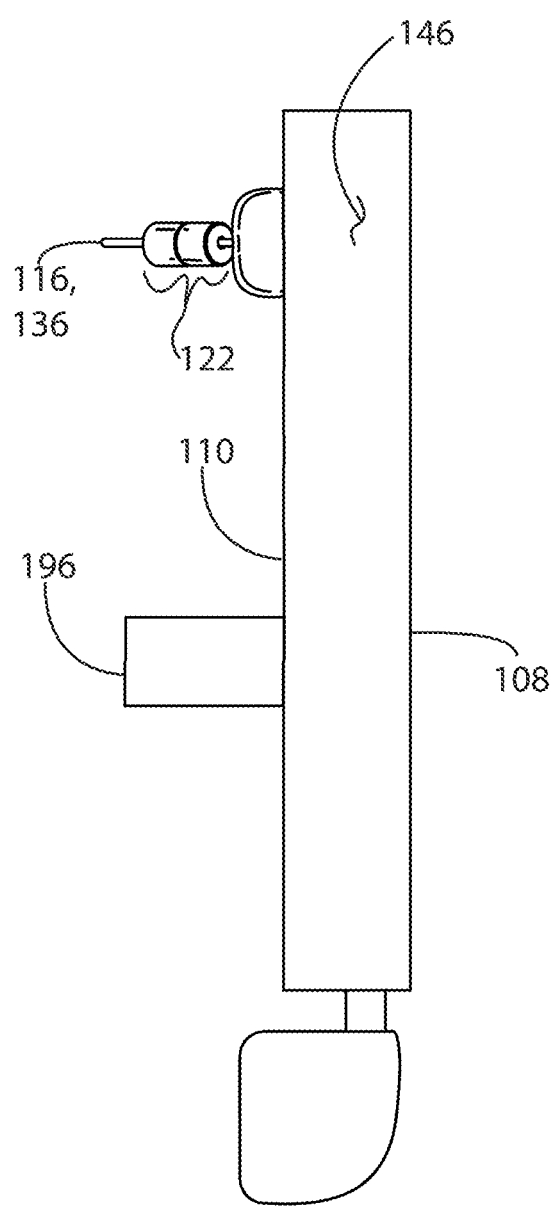
FIG. 8 shows a view of the left side of the clamp frame of FIGS. 6-7.

FIG. 8 shows a view toward a left panel 146 of the clamp assembly 104 of FIGS. 6-7. A clamp jaw 196, part of the self-centering clamp, extends outward from the back panel 110 of the clamp frame 108. A slack loop 136 formed in the flexible band 116 causes the flexible band 116 to extend outward and away from the back panel 110 so that the flexible band 116 may more easily be suspended from, or alternatively removed from, a tray table latch or other elongate support. An example of a flexible band connector 122 is also shown in FIG. 8.

Figure 9:
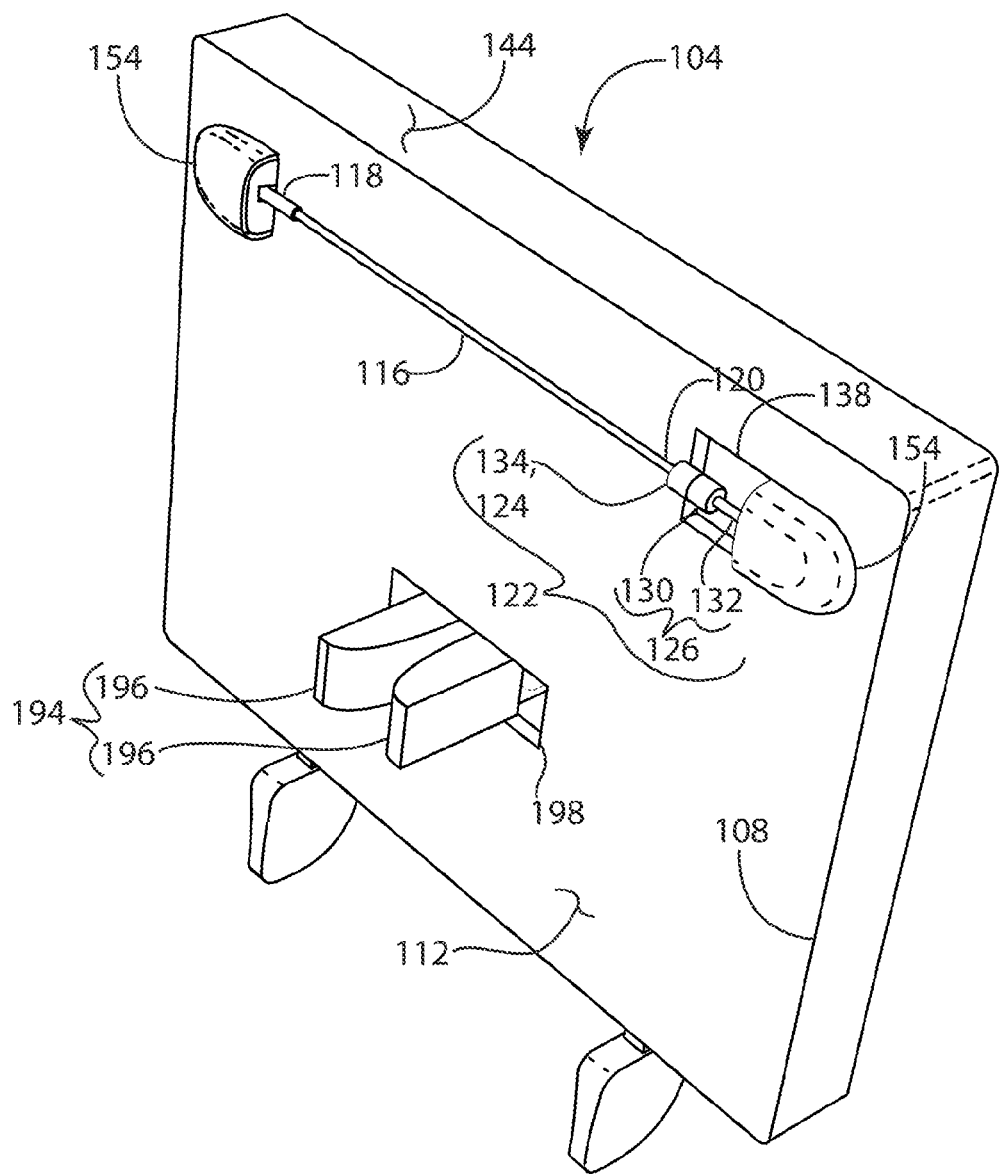
FIG. 9 shows pictorial view toward the rear of the clamp assembly of FIG. 3.

A pictorial view of a clamp assembly 104 is shown in FIG. 9, with a top panel 144 and a back surface 112 of the back panel of the clamp frame 108 visible. The self-centering clamp 194 includes a first clamp jaw 196 and an opposing second clamp jaw 196 extending through a lateral clamp slot 198 in the back surface 112 of the clamp frame 108. The fixed end 118 of the flexible band 116 is attached to the clamp frame 108 and is partially covered by a post cover 154. The detachable end 120 of the flexible band 116 is connected to the clamp assembly 104 by the flexible band connector 122. The flexible band connector 122 includes a first connector part 124 separably connected to a second connector part 126. In the example of FIG. 9, the second connector part 126 comprises a first magnet 130 and optionally comprises a flexible connector strap 132 for attaching the first magnet 130 to the clamp assembly 104. The first connector part 124 may alternatively be a second magnet 134 or a ferrous plate. In alternative embodiments, the first connector part 124 and second connector part 126 may optionally comprise complementary halves of a snap or complementary parts of hook-and-loop fastener material. The flexible band 116 and flexible band connector 122 are attached to the spring compression lever 140 (not visible in FIG. 8) through a lateral post slot 138 formed in the back surface 112 of the clamp assembly 104. A second post cover 154 covers part of the lateral post slot 138.

Figure 10:
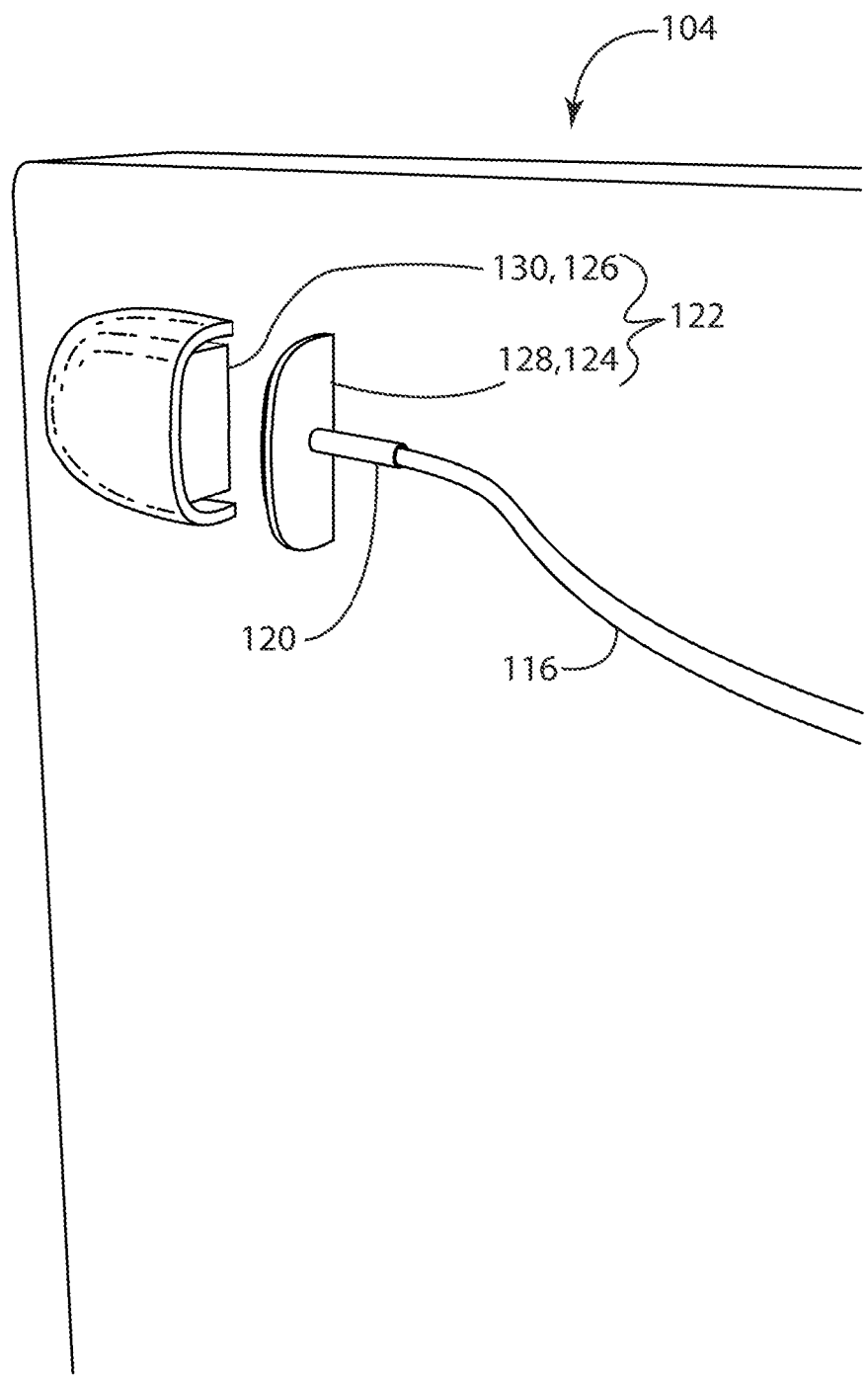
FIG. 10 illustrates a partial pictorial view of an alternative embodiment of a flexible band connector.

An alternative embodiment of a flexible band connector 122 is shown in the partial pictorial view of FIG. 10. In the example of FIG. 10, the flexible band connector 122 comprises a first connector part 124 attached to the detachable end 120 of the flexible band 116 and a second connector part 126 attached to the clamp assembly 104. In FIG. 10, the first connector part 124 comprises an attachment plate 128 and the second connector part 126 attached to the clamp assembly 104 comprises a first magnet 130. The attachment plate 128 magnetically attaches to the first magnet 130 and may be formed from a ferrous material or may alternately comprise a second magnet. In alternative embodiments of a clamp assembly, the flexible band connector 122 may optionally be arranged to connect to the clamp frame or to the spring compression lever. The attachment plate 128 may connect to the first magnet 130 on a side of the magnet as suggested in FIG. 10, or may alternatively be connected to an outer back surface of the magnet.

Figure 11:
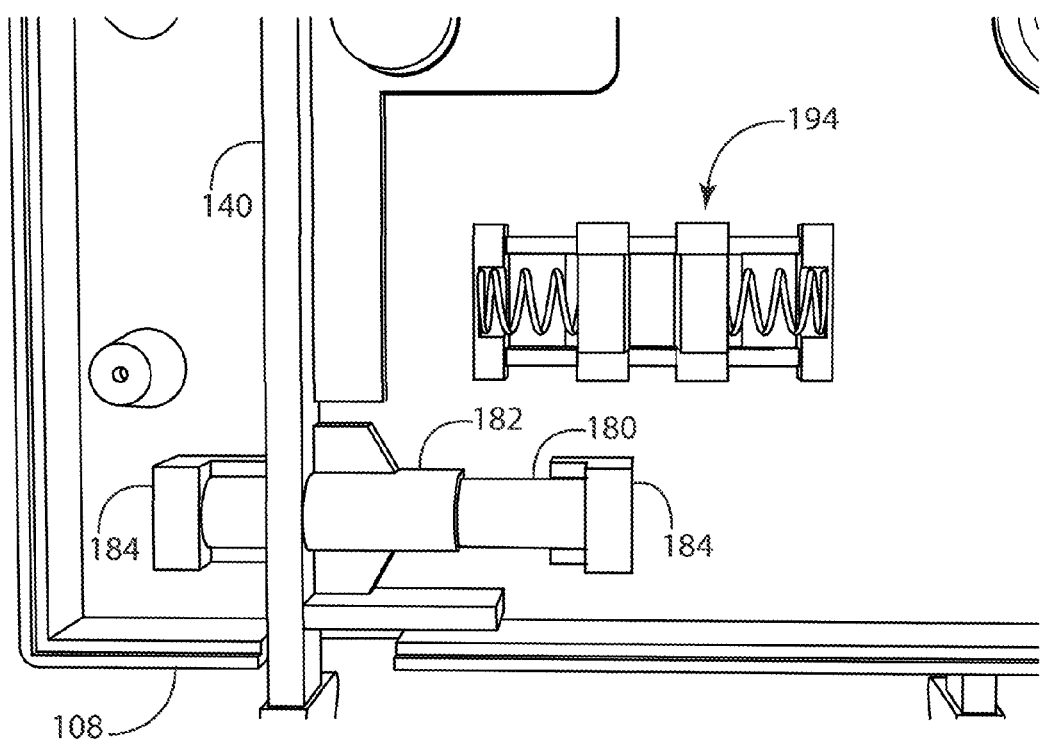
FIG. 11 illustrates an example of a guide shaft and guide bushing for providing smooth lateral motion of a spring compression lever.

A guide bushing on the spring compression lever is arranged to slide along a guide shaft in the clamp assembly to provide a smooth sliding motion for the spring compression lever. As shown in the partial front view of FIG. 11, a guide bushing 182 attached to the spring compression lever 140 is selected for a sliding fit on a guide shaft 180. Opposite ends of the guide shaft 180 are retained in the clamp frame 108 by two guide shaft retaining blocks 184 attached to the clamp frame. A travel limit tab 186 for limiting a range of motion for the spring compression lever 140 may optionally be formed as part of a shaft retaining block 184.

Figure 12:
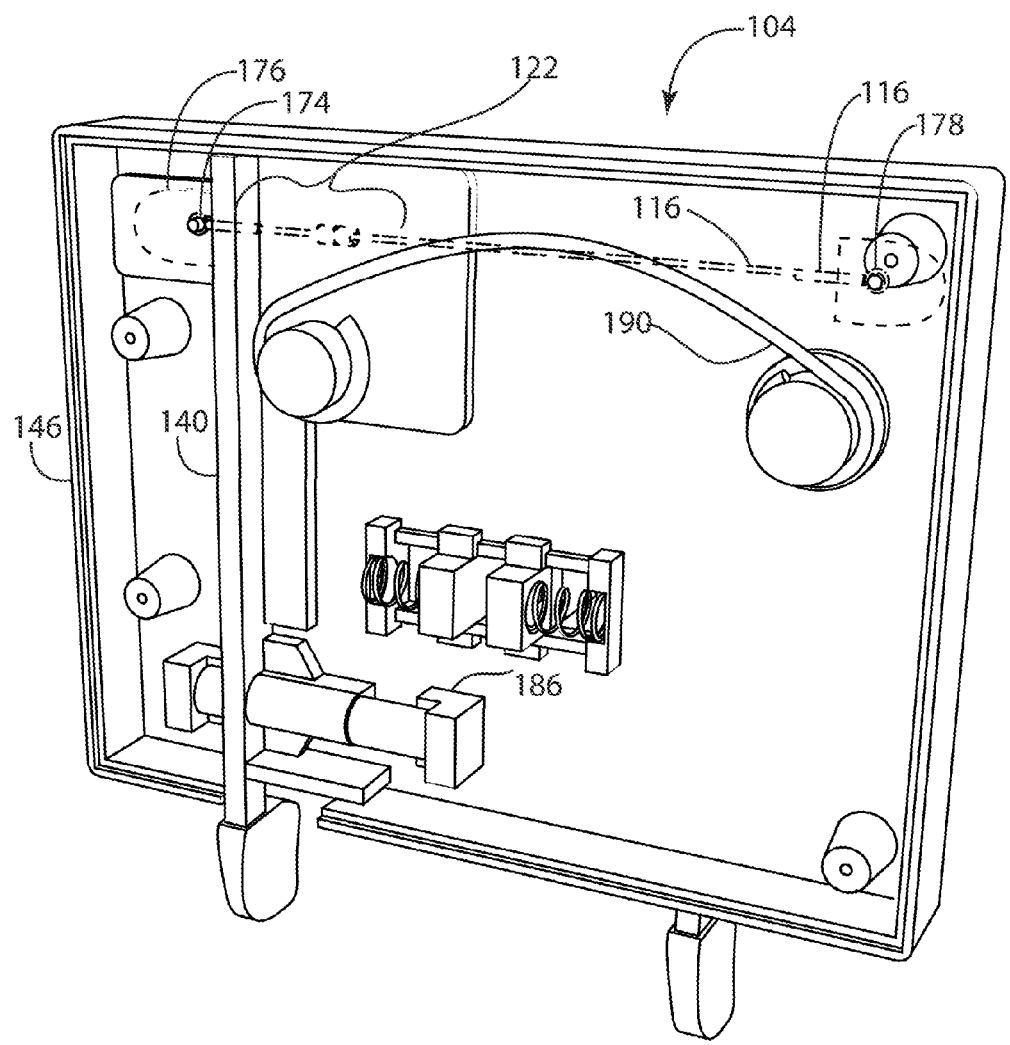
FIG. 12 shows a rear pictorial view of a clamp assembly with the spring compression lever and other components in positions to remove a slack loop from the flexible band.
Figure 13:
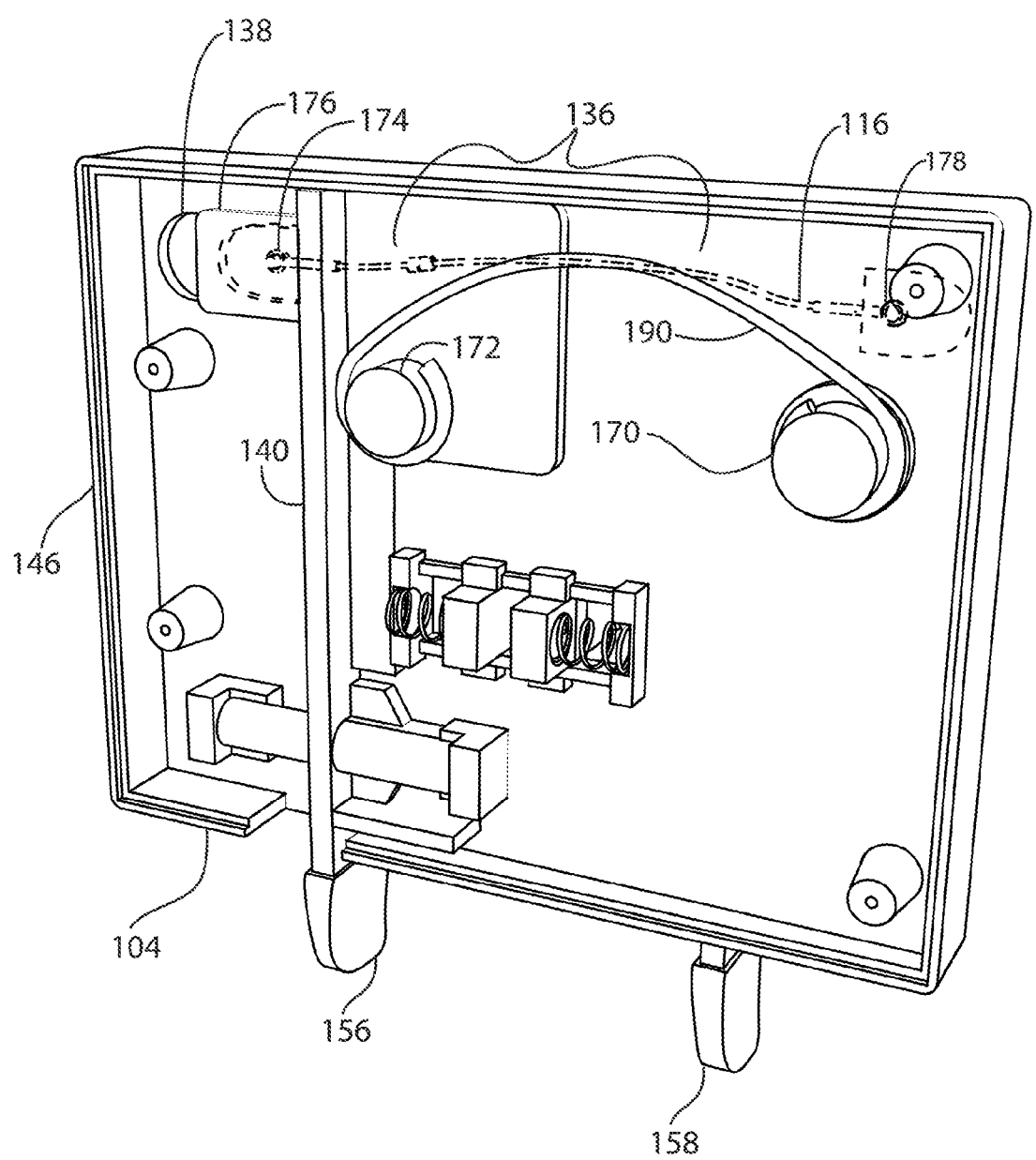
FIG. 13 shows a rear pictorial view of a clamp assembly with the spring compression lever and other components in positions to form a slack loop in the flexible band.

FIGS. 12-13 illustrate operation of the spring compression lever and flexible band. In FIG. 12, the flexible band connector 122 on the flexible band 116 is attached to a first band post 174. The first band post 174 is attached to the band plate 176 on the spring compression lever 140. The fixed end 118 of the flexible band 116 is attached to a second band post 178 attached to the clamp frame 108. In FIG. 12, the spring compression lever 140 is shown in its rest position closest to the left panel 146 of the clamp frame 108, the band tensioning spring 190 is shown fully extended, and the flexible band is extended to its maximum length without a slack loop present.

In FIG. 13, the spring compression lever 140 is shown displaced laterally toward the first spring post 170 and away from the left panel 146 of the clamp frame 108. The spring compression lever is displaced by a person squeezing the finger grips (156, 158). Releasing the finger grips permits the spring compression lever 140 to move toward the left panel 146 under the influence of a restoring force from the band tensioning spring 190. The guide bushing 182 is shown in FIG. 13 at its travel limit against the travel limit tab 186. The band tensioning spring 190 is shown fully compressed by displacement of the first band post 174 toward the second band post 178. With the band tensioning spring 190 compressed, a slack loop 136 is formed in the flexible band 116. As the spring compression lever 140 slides laterally toward the first spring post 170, the lateral post slot 138 in the back surface of the clamp frame 108 becomes visible. The lateral post slot 138 is partially covered by the band plate 176. The range of motion for the spring compression lever 140 and the length of the flexible band 116 are selected to form a slack loop 136 which extends far enough from the clamp assembly 104 to engage with latches found on many different seatback tray tables.

Figure 14:
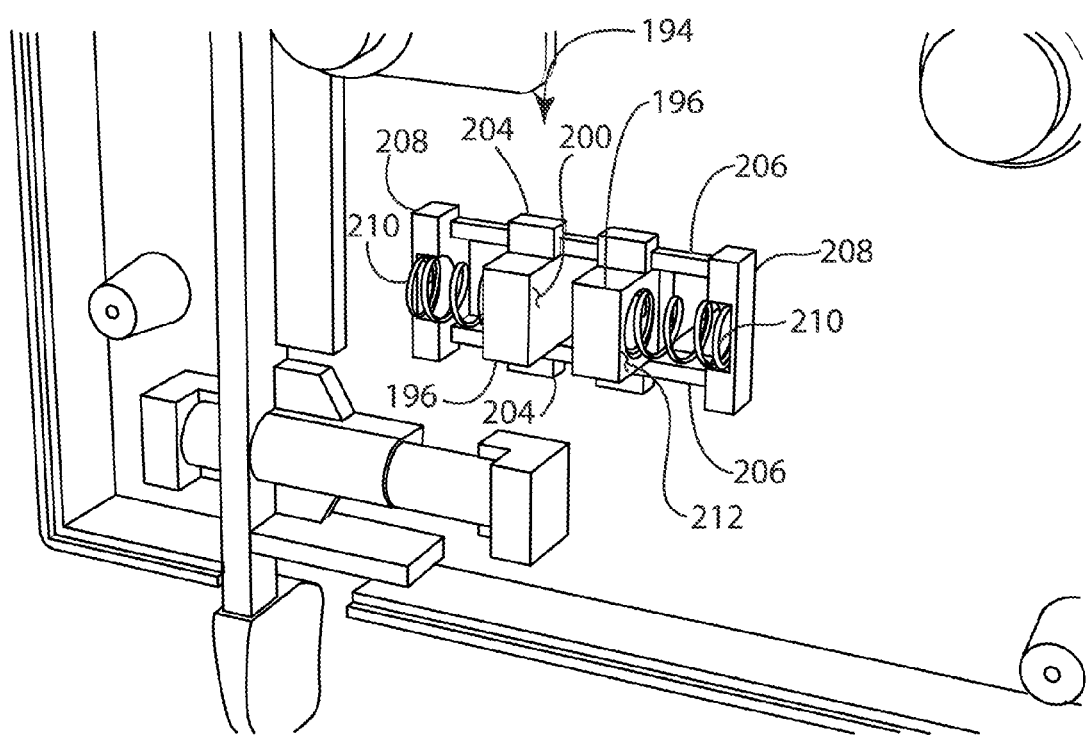
FIG. 14 shows a partial pictorial view of an example of a self-centering clamp.
Figure 15:
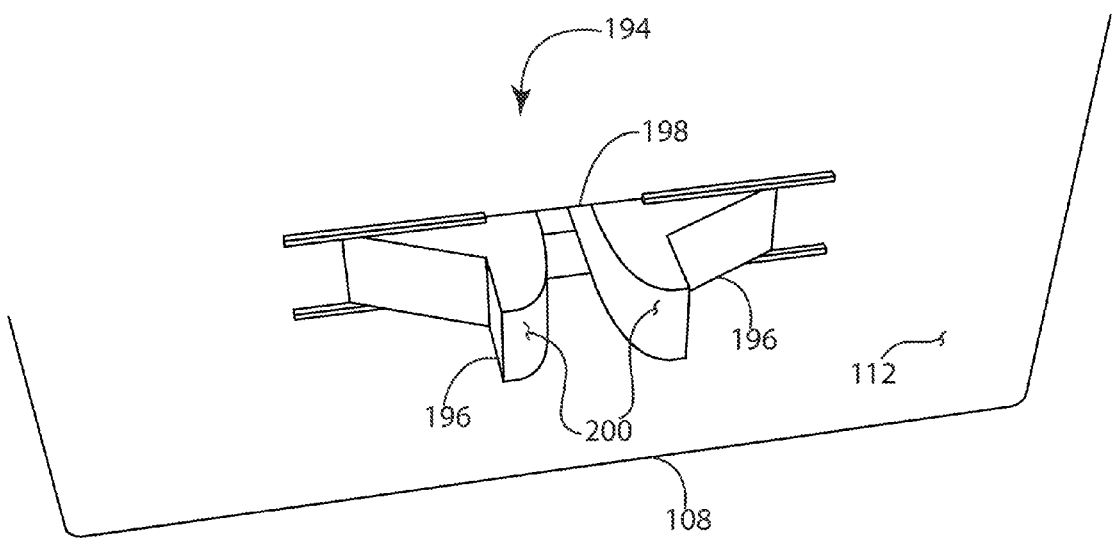
FIG. 15 shows a partial pictorial view of an example of clamp jaws extending through a lateral clamp slot in a back surface of a clamp frame.
Figure 16:
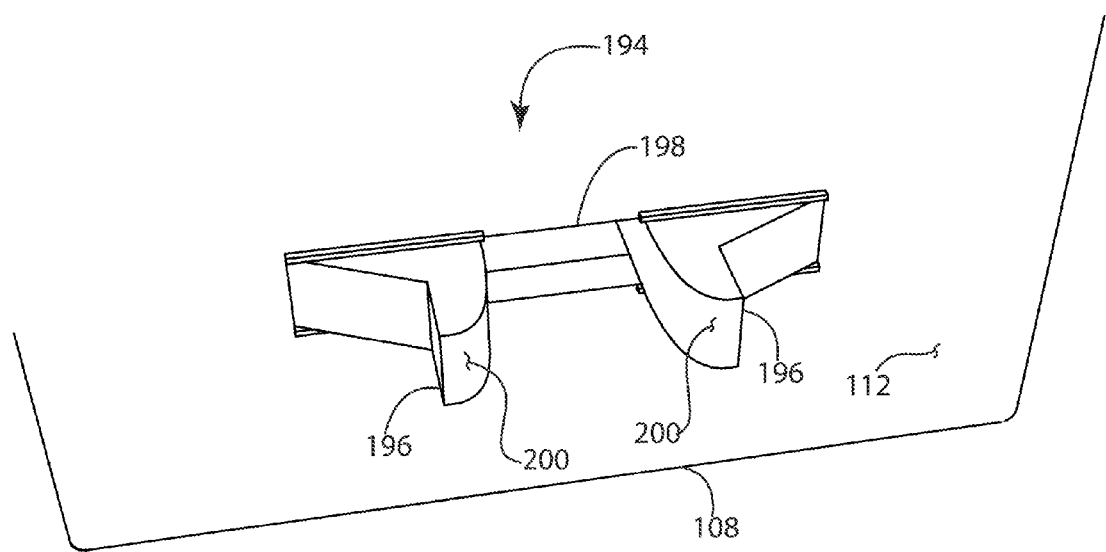
FIG. 16 shows the clamp jaws of FIG. 15, separated for gripping both sides of an elongated support.

An example of a self-centering clamp 194 is shown in FIGS. 14-16. FIG. 14 shows a partial pictorial view of a clamp frame 108 with the cover removed. FIGS. 15-16 show a partial pictorial view toward a back surface 112 of the clamp frame 108. In FIG. 14, pair of opposing clamp spring blocks 208, one at each end of the lateral clamp slot (not visible in this view) retain a pair of opposing clamp springs 210 arranged to force two clamp jaws 196 toward one another. Selecting a pair of clamp springs 210 with approximately equal values of spring constant and approximately equal values of spring length results in the clamp jaws 196 being self-centering. Although the clamp springs in FIG. 14 are helical springs, V-springs or cantilever springs may alternative be used. Each clamp spring 210 presses against a clamp spring block 208 and a spring contact face 212 on a clamp jaw 196. Opposing clamping faces 200 on the two clamp jaws 196 are arranged to contact opposite sides of a tray table latch when the self-centering clamp 194 is attached to the tray table latch. Each clamp jaw 196 includes a pair of support flanges 204 arranged for sliding contact with a pair of support rails 206, one of each support rail on opposite sides of the lateral clamp slot.

The clamping face 200 on each clamp jaw 196 is formed with a rounded end so that the clamp jaws are easily forced apart when the self-centering clamp 194 is pressed against a tray table latch or other elongate support. Clamp jaws with rounded ends are shown in FIGS. 15-16, which further illustrate how the clamp jaws are formed to track smoothly within the lateral clamp slot 198, without significant twisting or rotation of the clamp jaws. In FIG. 15, the clamp jaws 196 are close together. In FIG. 16, the clamping faces 200 of the clamp jaws 196 are separated from one another and represent an example of a position of the jaws when they are clamped against a tray table latch. When the clamp frame 108 is pulled away from a seatback and latch, the clamp jaws 196 move toward each other as shown in FIG. 15.

Figure 17:
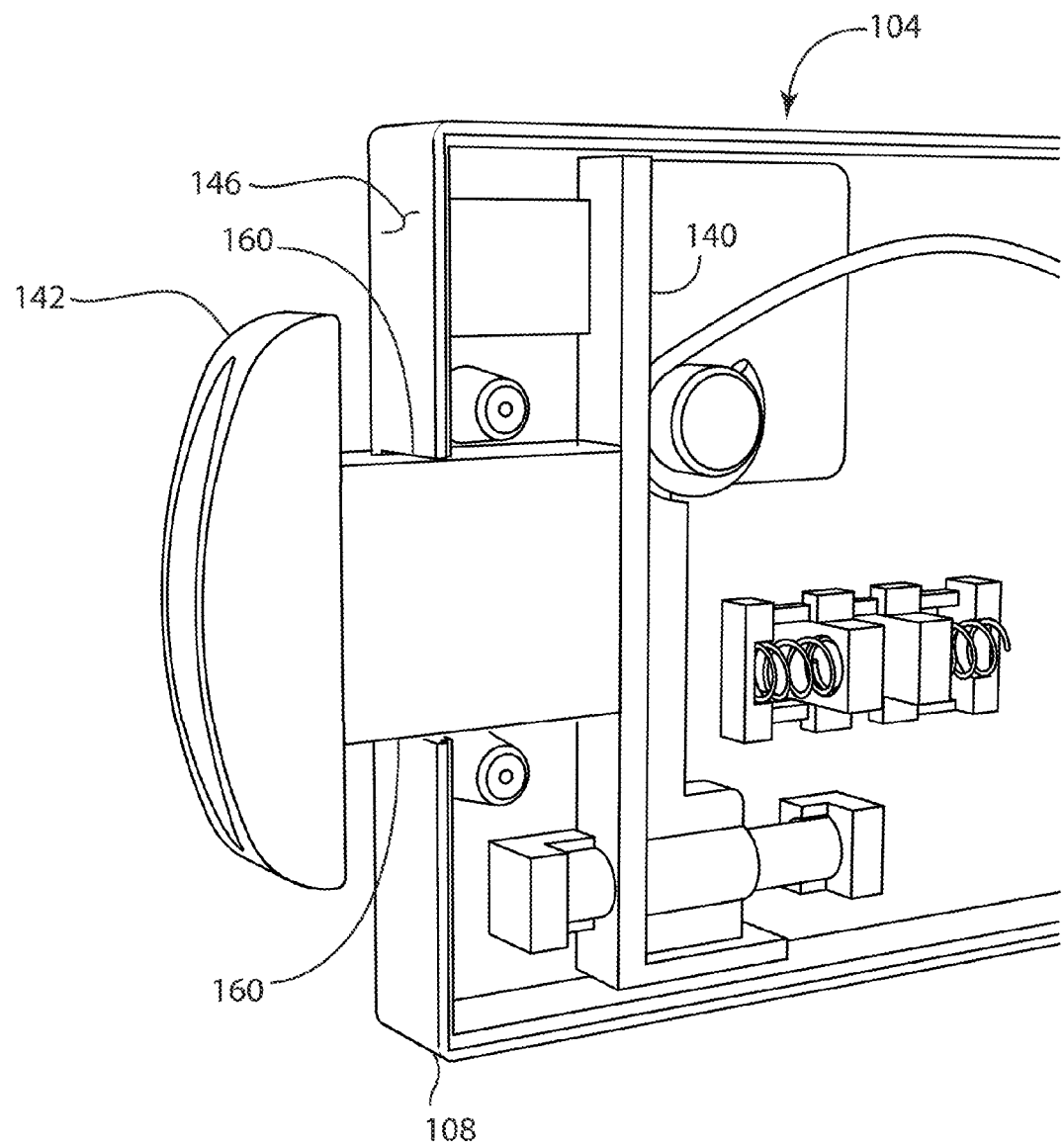
FIG. 17 shows a partial pictorial view of an alternative embodiment for a spring compression lever having a finger pad extending from a side of a clamp assembly.
Figure 18:
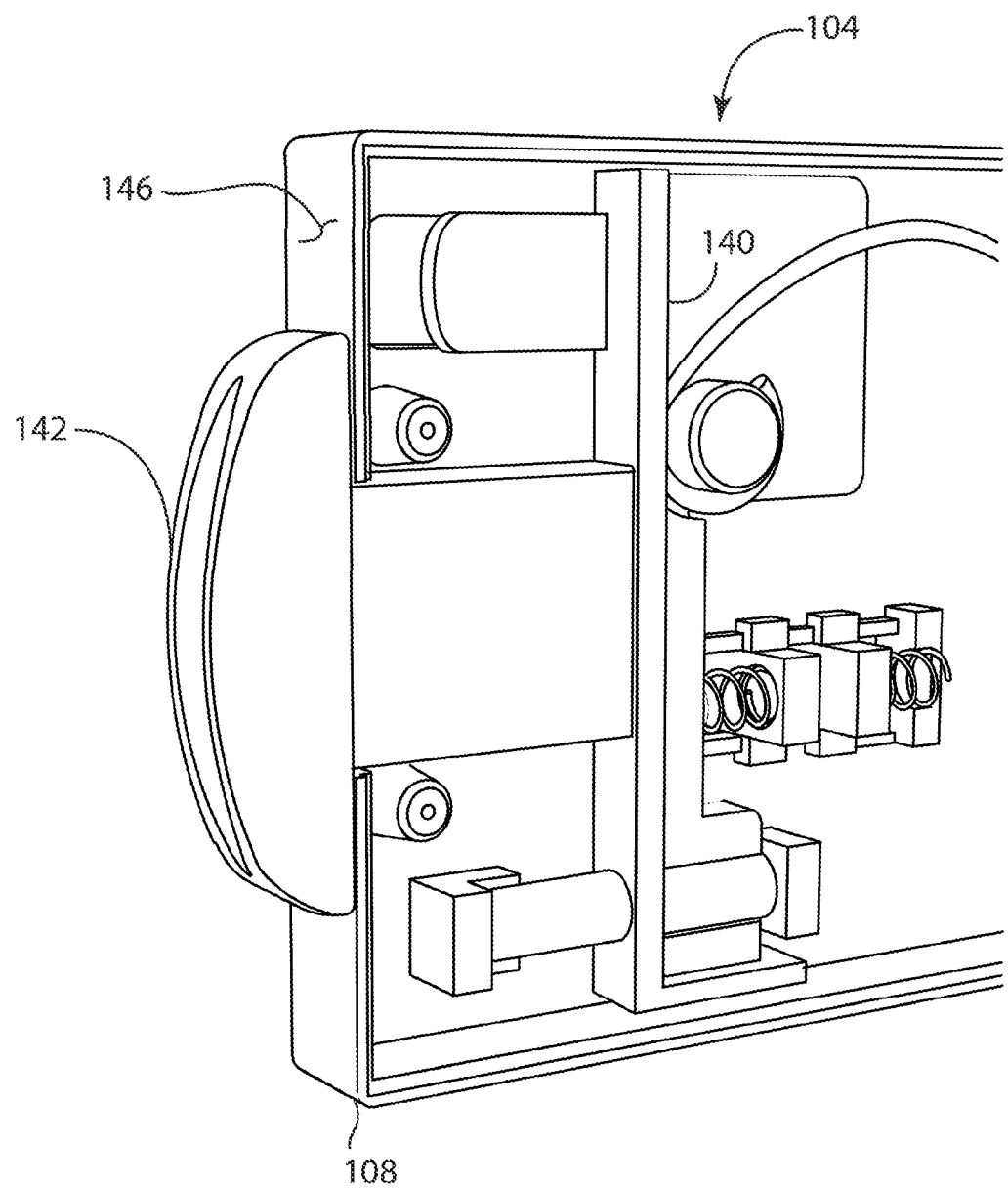
FIG. 18 shows the finger pad and spring compression lever of FIG. 17 in a fully compressed position.

An alternative embodiment of a clamp assembly 104 is shown in FIGS. 17-18. In previous examples, a spring compression lever was displaced by squeezing finger grips extending outward from a bottom panel of a clamp assembly. In the example of FIGS. 17-18, a finger pad 142 attached to a spring compression lever 140 extends through a slot 160 formed in the side panel 146 of the compression frame 108. The finger pad 142 of FIGS. 17-18 may enable persons with limited finger strength to more easily achieve full compression of the band compression spring in the clamp assembly, compared to the arrangement of finger pads shown in the example of FIG. 3. FIG. 17 shows the spring compression lever 140 and finger pad 142 in a rest position corresponding to no slack loop in the flexible band. FIG. 18 shows the spring compression lever 140 and finger pad 142 in a fully compressed position, corresponding to a flexible band with a slack loop in the band. The finger pad 142 may optionally be used to establish a displacement limit for the spring compression lever, as shown in FIG. 18.

Reclinable seats with stowable seatback tray tables may be designed according to transportation standards that specify, for example, seat size, displacement limits for reclining seatbacks, seat-to-seat spacing, and so on. Such standards may be directed at accommodating passengers within a selected range of body sizes, for example a selected range of passenger height or a related range of passenger eye height. Embodiments of the invention may therefore be designed to provide convenient viewing angles for electronic devices attached to standardized reclinable seats for a selected range of passenger eye heights. FIGS. 19-22 illustrate an example of a holder embodiment of the invention arranged to accommodate viewing angles of no more than 15 degrees from the horizontal for passengers having heights in a range from fifth percentile to ninety-fifth percentile when such passengers are seated in a standard coach-class airline seat. Broken lines in FIGS. 19-22 designate parts of a reclinable passenger seat.

Figure 19:
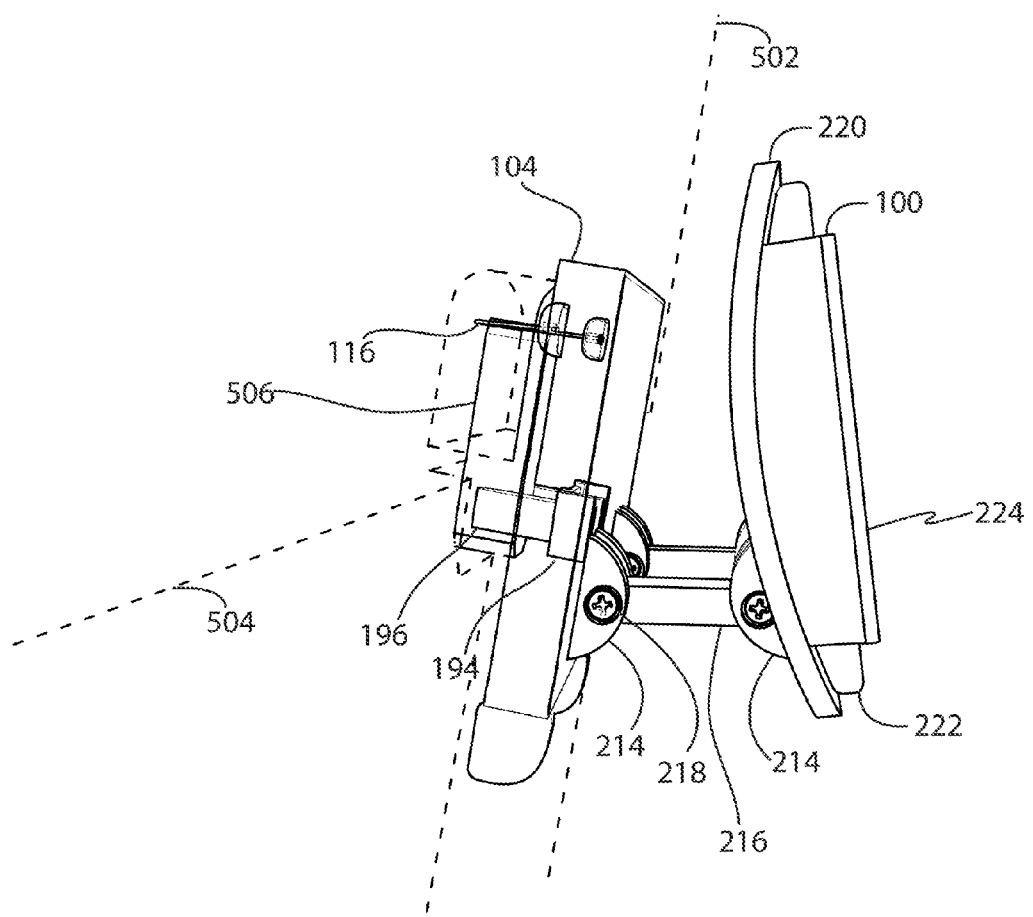
FIG. 19 is a partial side view of a holder embodiment of the invention attached to a tray table latch on a seatback.

In FIG. 19, a broken line 502 represents an edge of a seatback. Another broken line 504 represents an edge of a seatback tray table. A latch 506 is shown in solid lines to more clearly illustrate engagement with a clamp jaw 196 from a self-centering clamp 194. The self-centering clamp 194 is part of the clamp assembly 104 of an embodiment of the invention which further includes an adapter body 220 and a front plate 222 for holding a portable electronic device between a pair of retaining brackets 224. In FIG. 19, the clamp assembly 104 is drawn into close contact with the latch 506 by the flexible band 116. A support arm 216 rotationally couples to flanges 214 with pivot pins 218. Pivot pins 218 may optionally be smooth pins or threaded fasteners.

Figure 20:
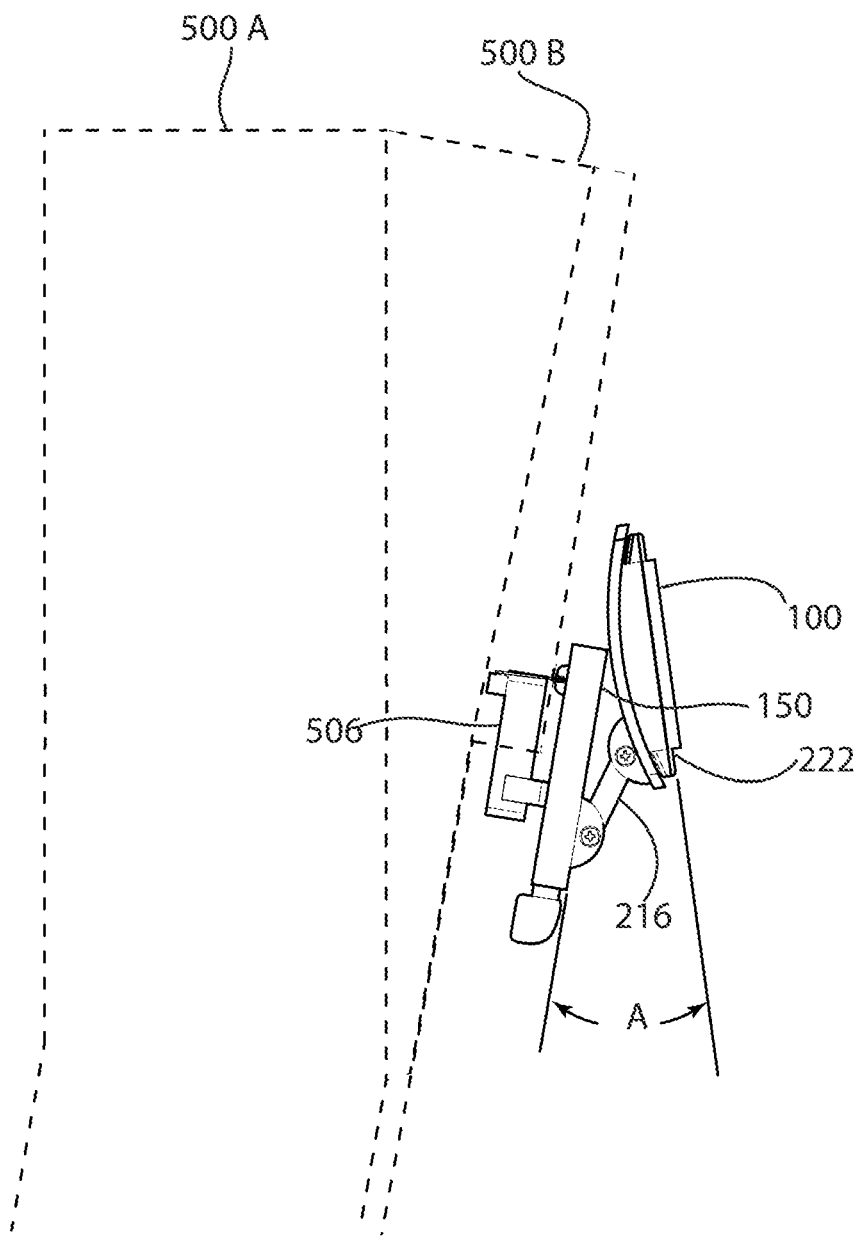
FIG. 20 is a partial side view of the holder of FIG. 19 with an angle A between parts of the holder.
Figure 21:
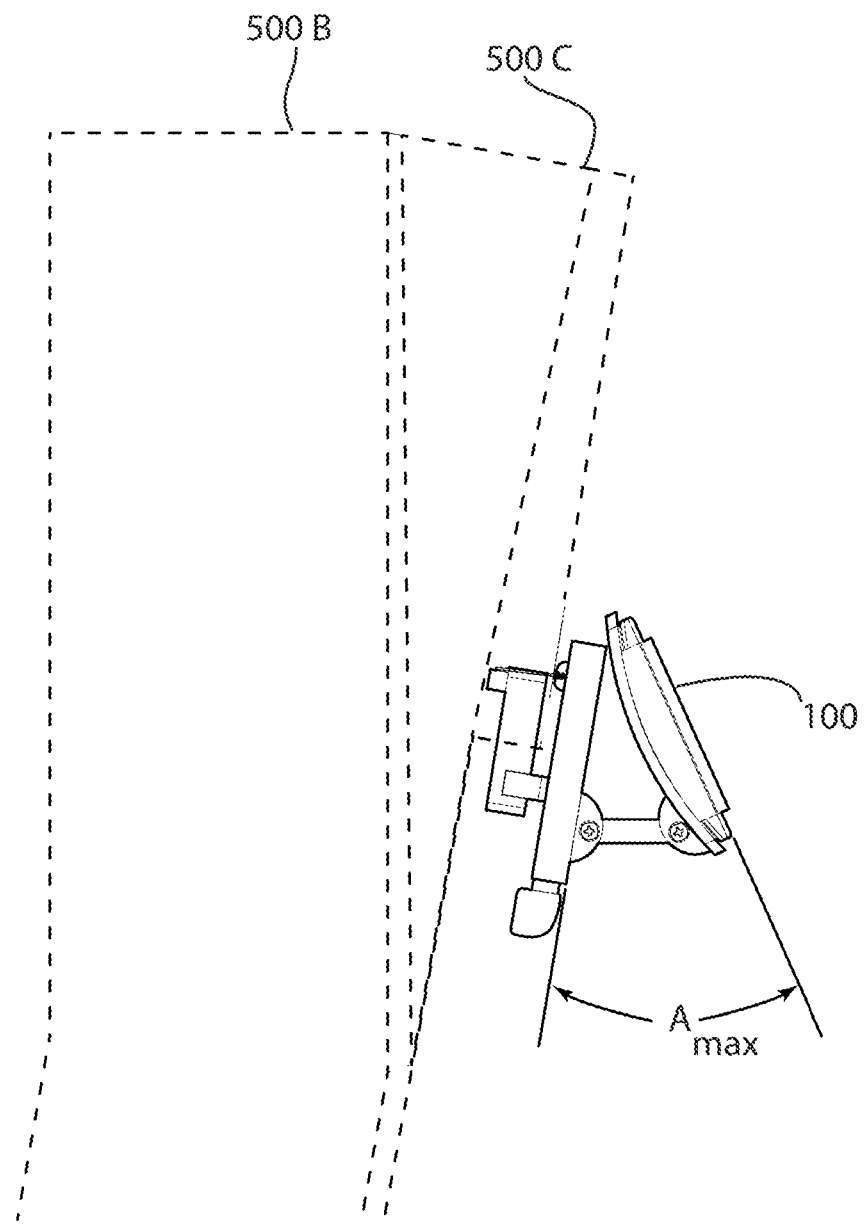
FIG. 21 is a partial side view of the holder of FIGS. 19-20, with an angle Amax between parts of the holder.
Figure 22:
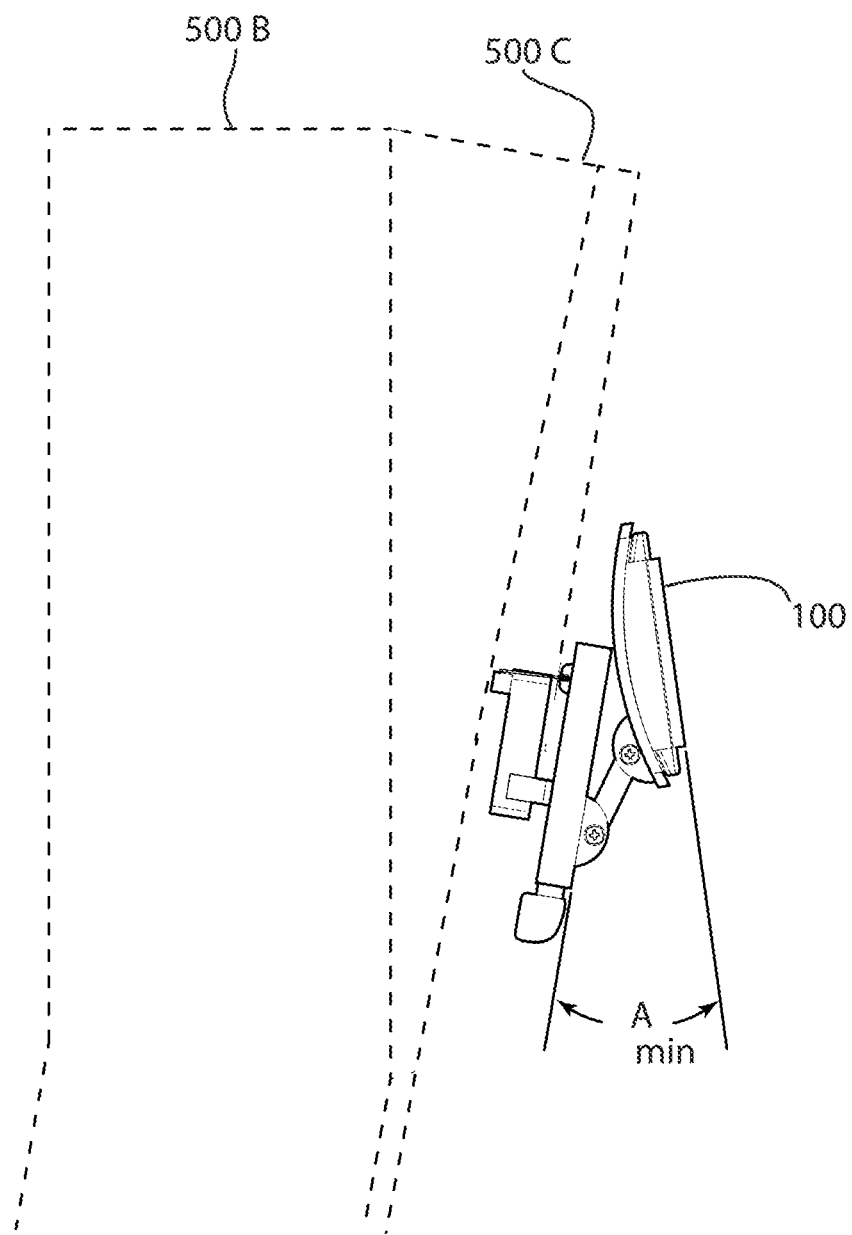
FIG. 22 is a partial side view of the holder of FIGS. 19-21, with an angle Amin between parts of the holder.

FIG. 20 shows an angle A between the front plate 222 of the adapter body and the front panel 150 of the clamp frame. FIG. 21 shows a maximum value for angle A, labeled Amax, corresponding to a 15 degree viewing angle for a person with ninety-fifth percentile height and the seatback 500C reclined to its limit, where the viewing angle is an angle downward from horizontal. A seatback reclined to an intermediate position is shown by broken lines 500B. FIG. 22 shows a minimum value for angle A, labeled Amin, corresponding to a 15 degree viewing angle for a person with fifth percentile height and the seatback 500C reclined to its limit.

Figure 23:
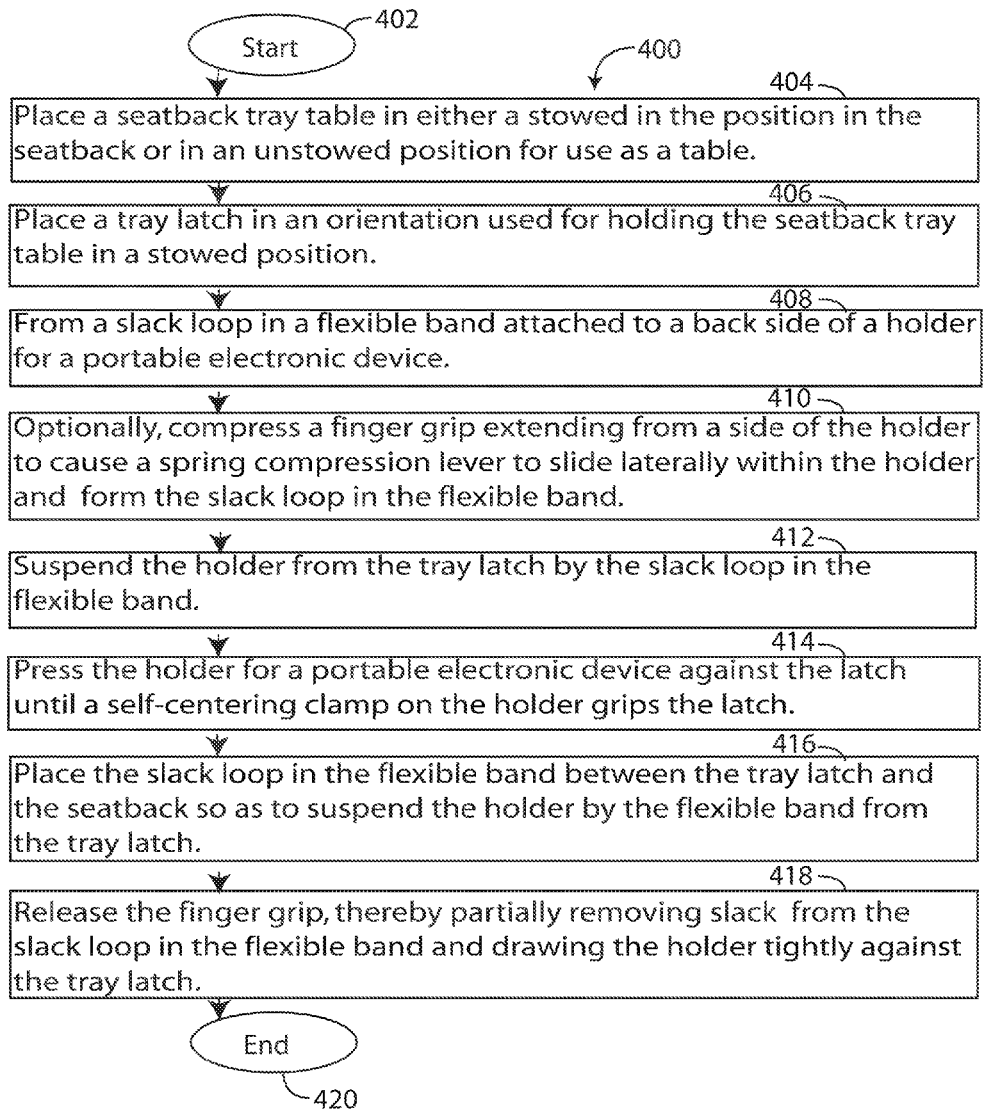
FIG. 23 is a block diagram illustrating an example of steps in accord with a method embodiment of the invention.

A method embodiment of the invention comprises steps for holding a portable electronic device against a seatback having a stowable seatback tray table. As shown in FIG. 23, the method embodiment of the invention 400 begins at step 402 and proceeds to step 404, placing the seatback tray table in either a stowed position in the seatback or in an unstowed position for use as a table.

Next, at step 406, a tray latch is placed in an orientation used for holding the seatback tray table in a stowed position.

Next, at step 408, a slack loop is formed in a flexible band attached to a back side of a holder for a portable electronic device.

At step 410, a finger grip extending from a side of the holder for the portable electronic device may be compressed to cause a spring compression lever to slide laterally within the holder and form the slack loop in the flexible band.

Next, at step 412, the holder is suspended from the tray latch by the slack loop in the flexible band.

Next, at step 414, the holder is pressed against the latch until a self-centering clamp on the holder grips the latch.

At step 416, the slack loop in the flexible band is placed between the tray latch and the seatback so as to suspend the holder by the flexible band from the tray latch.

At step 418, the finger grip is released, thereby partially removing slack from the slack loop in the flexible band and drawing the holder tightly against the tray latch.

The example of FIG. 23 ends with step 420.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, or use of equivalent functional steps for steps described herein. Such insubstantial variations are to be considered within the scope of what is contemplated here. Moreover, if plural examples are given for specific means, or steps, and extrapolation between or beyond such given examples is obvious in view of the present disclosure, then the disclosure is to be deemed as effectively disclosing and thus covering at least such extrapolations.

Unless expressly stated otherwise herein, ordinary terms have their corresponding ordinary meanings within the respective contexts of their presentations, and ordinary terms of art have their corresponding regular meanings.

What is claimed is:

1. A method for holding a portable electronic device against a seatback having a stowable seatback tray table, comprising:
   placing the seatback tray table in either a stowed position in the seatback or in an unstowed position for use as a table;
   placing a tray latch in an orientation used for holding the seatback tray table in a stowed position;
   forming a slack loop in a flexible band attached to a back side of a holder;
   suspending the holder from the tray latch by the slack loop in the flexible band; and
   pressing the holder against the tray latch until a self-centering clamp on the holder grips the tray latch.

2. The method of claim 1, further comprising:
   placing the slack loop in the flexible band between the tray latch and the seatback so as to suspend the holder by the flexible band from the tray latch; and
   compressing a finger grip extending from a side of the holder to cause a spring compression lever to slide laterally within the holder and form the slack loop in the flexible band.

3. The method of claim 2, further comprising releasing the finger grip, thereby partially removing slack from the slack loop in the flexible band and drawing the holder tightly against the tray latch.

* * * * *